United States Patent
Yamamoto et al.

(10) Patent No.: US 7,141,525 B2
(45) Date of Patent: Nov. 28, 2006

(54) OPTICAL GLASS FOR PRECISION MOLDING

(75) Inventors: Yoshinori Yamamoto, Saitama-ken (JP); Koichi Tsuchiya, Saitama-ken (JP); Naruhito Sawanobori, Saitama-ken (JP); Shinobu Nagahama, Saitama-ken (JP)

(73) Assignee: Sumita Optical Glass, Inc., Saitama-Ken (JP)

( * ) Notice: Subject to any disclaimer, the term of this patent is extended or adjusted under 35 U.S.C. 154(b) by 0 days.

(21) Appl. No.: 10/980,236

(22) Filed: Nov. 4, 2004

(65) Prior Publication Data

US 2005/0192174 A1    Sep. 1, 2005

(30) Foreign Application Priority Data

Feb. 26, 2004 (JP) .............................. 2004-050688

(51) Int. Cl.
*C03C 3/16*    (2006.01)
*C03C 3/21*    (2006.01)

(52) U.S. Cl. ........................... 501/45; 501/46; 501/47; 501/42

(58) Field of Classification Search ............ 501/45–48, 501/901
See application file for complete search history.

(56) References Cited

U.S. PATENT DOCUMENTS 4,996,173 A * 2/1991 Tachiwana ................... 501/73
6,333,282 B1  12/2001 Nakahata et al.

FOREIGN PATENT DOCUMENTS

| JP | 1-308843 | 12/1989 |
|---|---|---|
| JP | 7-247135 | 9/1995 |
| JP | 7-247136 | 9/1995 |
| JP | 8-157231 | 6/1996 |
| JP | 2001-58845 | 3/2001 |
| JP | 2003-300751 | 10/2003 |
| JP | 2003-335549 | 11/2003 |

* cited by examiner

*Primary Examiner*—J. A. Lorengo
*Assistant Examiner*—Elizabeth A. Bolden
(74) *Attorney, Agent, or Firm*—McDermott Will & Emery LLP

(57) ABSTRACT

The present invention provides a high refractive index, high dispersion optical glass for precision molding, being free from harmful materials causing environmental problems, such as lead oxide, etc., and having a low yield temperature (At), i.e. at most 580° C., a refractive index (nd) of at least 1.89 and an Abbe number (vd) of at most 23.0 and further providing a low softening property as well as an improved mass production property with less coloration, which is represented in terms of for making up the glass, by the following chemical composition (wt %):

| | |
|---|---|
| $P_2O_5$ | 3 to 20% |
| $B_2O_3$ | 0 to 5% |
| $GeO_2$ | more than 14 to 37% |
| Sum of $P_2O_5 + B_2O_3 + GeO_2$ | 24 to 43% |
| $Li_2O$ | 0 to 5% |
| $Na_2O$ | 0 to 8% |
| $K_2O$ | 0 to 10% |
| Sum of $Li_2O + Na_2O + K_2O$ | 1 to 10% |
| $Nb_2O_5$ | 0 to 50% |
| $Bi_2O_3$ | 12 to 67% |
| BaO | 0 to 5% |
| $WO_3$ | 0 to 12%. |

2 Claims, No Drawings

OPTICAL GLASS FOR PRECISION MOLDING

BACKGROUND OF THE INVENTION

1. Field of the Invention

This invention relates to an optical glass for precision molding, capable of carrying out a precision molding at a low temperature and needing no polishing and grinding after the precision molding.

2. Description of the Prior Art

With lately marked progress in obtaining high performance and effective miniaturization of optical devices such as digital cameras, the requirements of miniturization and weight reduction for lenses composing such optical systems are increasing more and more and the use of aspheric lenses made by the precision molding method has become indispensable. Furthermore, a precisely molded, high refractive index and high dispersion glass has strongly been required so as to realize a very compacted optical system in various optical devices.

In the high refractive index, high dispersion optical glass of the prior art, a composition system containing a large amount of lead oxide is typical, which is stable because of having a high devitrification resistance and has been used for precision molding because of having a low transition point (Tg) and low yield temperature (At). For example, JP-A-1-308843, JP-A-7-247135 and JP-A-7-247136 respectively disclose an optical glass for precision molding containing a large amount of lead oxide.

However, the precision molding has generally been carried out in a reducing atmosphere so as to prevent a mold from oxidation, so if lead oxide is contained in the glass composition, the lead oxide on the glass surface is reduced and deposited as lead on the surface of a precision molding lens. The lead is evaporated by heating for the precision molding, a part of which adheres to the surface of the mold material to form a convex part which is then transferred to the surface of the precision molding lens as it is. When such steps are continuously repeated, the surface accuracy of the precision molding lens cannot be maintained. In addition, lead oxide has such a problem that it is harmful to the environment and human body. Accordingly, the glasses disclosed in the foregoing JP-A-1-308843, JP-A-7-247135 and JP-A-7-247136 are not suitable, nor practically used as an optical glass for precision molding.

On the other hand, in glasses described in JP-A-8-157231, JP-A-2003-300751 and JP-A-2003-335549, surely, lead oxide is not contained. In JP-A-8-157231, however, in place of the lead oxide, $TiO_2$ is all incorporated, although defined as an optional component in claim 5, in order to obtain high refractive index, high dispersion properties as shown in Examples 7 to 11 (Cf. JP-A-8-157231, page 7, Table 2). Consequently, the resulting glass is very strongly colored. In JP-A-2003-335549, similarly, in Examples (Cf. JP-A-2003-335549, Table on pages 4 to 6) $TiO_2$ is all incorporated. In an invention described in JP-A-2003-300751, $TiO_2$ is an essential component. In the ordinary optical system, use of a single glass lens is not realistic and many optical systems are substantially composed of a number of lenses. Thus, it is desired that coloration of these glass lenses is rendered as little as possible. Accordingly, the glasses described in JP-A-8-157231, JP-A-2003-300751 and JP-A-2003-335549 are substantially caused to have high referactive index, high dispersion properties by $TiO_2$, which cannot be said to be preferable from the standpoint of optical designing.

The glass described in JP-A-2001-058845 (U.S. Pat. No. 6,333,282B1) is a high refractive index, high dispersion optical glass of $P_2O_5$—$Nb_2O_5$—$Bi_2O_3$-alkali metal oxide type, the present inventors have invented, having a refractive index (nd) of at least 1.83 and Abbe number (vd) of at most 26.0. The refractive index (nd) of the optical glass herein described is only less than 1.89, and if the refractive index is at least this range, the devitrification resistance is deteriorated to render it unstable. This is the limit for the glass.

SUMMARY OF THE INVENTION

It is an object of the present invention to provide an optical glass for precision molding, capable of carrying out a precision molding at a low temperature, without needing polishing and grinding after the precision molding, whereby the above described problems of the prior art can be solved.

It is another object of the present invention to provide a high refractive index, high dispersion optical glass for precision molding, being free from harmful materials causing environmental problems, such as lead oxide, etc., and having a low yield temperature (At), a refractive index (nd) of at least 1.89 and an Abbe number (vd) of at most 23.0.

As a result of our various efforts to achieve the above described objects, it is found that these objects can be attained by an optical glass for precision molding, in which $P_2O_5$, $GeO_2$, $Bi_2O_3$ and alkali metal oxides are defined in the specified ranges, in particular, by incorporating $GeO_2$ as a very effective component for raising the refractive index of the glass in a proportion of exceeding 14%.

DETAILED DESCRIPTION OF THE INVENTION

That is, according to the present invention, there is provided a high refractive index, high dispersion optical glass for precision molding, having excellent properties, i.e. refractive index (nd) of at least 1.89, preferably 1.89 to 2.03, Abbe number (vd) of at most 23.0, preferably 23.0 to 19.0 and further providing a low softening property shown by a yield temperature (At) of at most 580° C., as well as an improved mass production property with being less colored. In this specification, the yield temperature is defined based on the measurement by TMA (Thermomechanical Analyzer).

Specifically, the present invention relates to a high refractive index, high dispersion optical glass for precision molding, which is represented, in term of atoms for making up the glass, by the following chemical composition (wt %):

|  |  | Preferred Range |
|---|---|---|
| $P_2O_5$ | 3.0 to 20.0% | 4.0 to 19.0% |
| $B_2O_3$ | 0 to 5.0% | 0 to 3.0% |
| $GeO_2$ | more than 14.0 to 37.0% | more than 14.0 to 36.0% |
| Sum of $P_2O_5$ + $B_2O_3$ + $GeO_2$ | 24.0 to 43.0% | 25.0 to 42.0% |
| $Li_2O$ | 0 to 5.0% | 0 to 4.0% |
| $Na_2O$ | 0 to 8.0% | 0 to 7.0% |
| $K_2O$ | 0 to 10.0% | 0 to 9.0% |
| Sum of $Li_2O$ + $Na_2O$ + $K_2O$ | 1.0 to 10.0% | 1.5 to 9.0% |
| $Nb_2O_5$ | 0 to 50.0% | 0 to 49% |
| $Bi_2O_3$ | 12.0 to 67.0% | 13.0 to 66.0% |
| BaO | 0 to 5.0% | 0 to 3.0% |
| $WO_3$ | 0 to 12.0% | 0 to 11.0% |

The reasons for limiting the composition range (% should be taken as those by weight unless otherwise indicated) of each component of this optical glass according to the present invention are as follows:

$P_2O_5$ is an essential component for the optical glass according to the present invention and a main component for composing a network structure of the glass, which is present in a proportion of 3.0 to 20.0%, since if more than 20.0%, the high refractive index, high dispersion cannot be maintained, while if less than 3.0%, the devitrification tendency is increased to render the glass unstable. The preferred range is 4.0 to 19.0%.

$B_2O_3$ is an optional component but an effective component for composing a network structure similar to $P_2O_5$ and rendering uniform the glass using in a suitable amount, which is present in a proportion of 0 to 5.0%, since if more than 5.0%, the aimed low yield temperature (At) and high refractive index, cannot be maintained and the glass becomes unstable. The preferred range is 0 to 3.0%.

$GeO_2$ is an essential and very effective component for composing a network structure similar to $P_2O_5$ and increasing the refractive index of the glass. If the amount of $GeO_2$ exceeds 37.0%, the devitrification tendency is increased to render tha glass unstable, while if 14.0% or less, the previously aimed refractive index is hard to obtain. Thus, the content of $GeO_2$ should be more than 14.0% to 37.0% or less. The preferred range is more than 14.0% to at most 36.0%.

When the sum of $P_2O_5$, $B_2O_3$ and $GeO_2$ exceeds 43.0%, the glass becomes unstable, while if less than 24.0%, a previously aimed refractive index and yield temperature (At) are hard to obtain. Accordingly, the sum of $P_2O_5$, $B_2O_3$ and $GeO_2$ should be in a range of 24.0 to 43.0%, preferably 25.0 to 42.0%.

$Li_2O$ is an optional, but very effective component for lowering the softening point of the glass in the similar manner to $Na_2O$. If exceeding 5.0%, however, the coefficient of thermal expansion of the glass is increased and correct transferring of a lens surface during precision molding is difficult, while the water resisting property is also deteriorated. Accordingly, the content of $Li_2O$ should be in a range of 0 to 5.0%, preferably 0 to 4.0%.

$Na_2O$ is an optional component for the present invention, but a very important component for largely contributing to the low softening and stability of the glass. If exceeding 8.0%, however, a previously aimed refractive index is hard to obtain and the water resistance of the glass is deteriorated. Thus, the content of $Na_2O$ should be 0 to 8.0%, preferably 0 to 7.0%.

$K_2O$ is an optional component, but a very important component for low softening point of the glass, similar to $Na_2O$. If exceeding 10.0%, however, the water resistance of the glass is deteriorated. Thus, the content of $K_2O$ should be 0 to 10.0%, preferably 0 to 9.0%.

However, it is essential to incorporate any one of alkali metal oxides of $Li_2O$, $Na_2O$ and $K_2O$ in a range of 1.0 to 10.0%, preferably, 1.5 to 9.0%.

$Bi_2O_3$ is an essential component for the optical glass according to the present invention and a very important component for lowering the yield temperature (At) as well as raising the refractive index of the glass in the similar manner to alkali metal oxides. If less than 12.0%, however, the effect is decreased, while if exceeding 67.0%, a noble metal of a melting container tends to be attacked thereby to color the glass and moreover, the glass becomes very unstable. Accordingly, the content of $Bi_2O_3$ should be in a range of 12.0 to 67.0%, preferably 13.0 to 66.0%.

$Nb_2O_5$ is an optional component, but an effective component for attaining the aimed high refractive index, high dispersion. If exceeding 50.0%, however, the melting property is markedly deteriorated and the glass is very unstable. Accordingly, the content of $Nb_2O_5$ should be in a range of 0 to 50.0%, preferably 0 to 49.0%.

$WO_3$ is an optional component but an effective component for attaining the aimed high refractive index, high dispersion properties according to the present invention, similar to $Nb_2O_5$, but if exceeding 12.0%, the melting property of the glass is much deteriorated and the glass becomes very unstable. Thus, the content of $WO_3$ should be in a range of 0 to 12.0%, preferably 0 to 11.0%.

BaO is an optional component, but an effective component for improving the solubility and stability of the glass. If exceeding 5.0%, however, it is difficult to obtain a previously aimed low yield temperature (At). Thus, the content of BaO should be in a range of 0 to 5.0%, preferably 0 to 3.0%.

In the optical glass of the present invention, in addition to the above described components, $In_2O_3$, $ZrO_2$, $Ta_2O_5$, $Ga_2O_3$, MgO, ZnO, CaO, SrO, etc. can be incorporated for the purpose of controlling the optical constants, improving the melting property and increasing the stability of the glass without departure from the scope of the present invention but in view of the standpoint of obtaining a good quality glass capable of satisfying the above described objects, it is preferable not to incorporate these components therein.

Production of the optical glass according to the present invention is carried out by weighing and mixing the corresponding raw material compounds so that a predetermined proportion of the object composition is given, for example, oxides, hydroxides, carbonates, nitrates and phosphates, adequately blending these materials, charging the resulting mixture in a platinum crucible, melting in an electric furnace at a temperature of 900 to 1200° C. with suitable agitation to render homogeneous, cleaning and casting the mixture in a preheated metallic mold at a suitable temperature and then gradually cooling. A small amount of a defoaming agent such as $Sb_2O_3$, etc. can further be added.

The following examples are given in order to illustrate the present invention in detail without limiting the same.

EXAMPLES 1 TO 9

Examples of compositions (weight %) of the optical glass according to the present invention and their characteristic values of refractive index (nd), Abbe number (vd) and yield temperature (At) are shown in Table 1. The yield temperature (At) was measured by the use of a thermomechanical analyzer (TMA) in the case of raising the temperature at 5° C. per minute.

Optical glasses of this Example were prepared by using the corresponding oxides, hydroxides, carbonates, nitrates and phosphates as raw materials for each component, weighing these materials to give proportions of compositions as shown in Table 1, adequately mixing, then charging in a platinum crucible, melting in an electric furnace at 900 to 1200° C., stirring the mixture at a suitable time to render homogeneous, cleaning, then casting in a metallic mold preheated at a suitable temperature and gradually cooling to prepare an optical glass of each Example.

Then, a glass block with a predetermined weight was cut out of the resulting glass, polished in a columnar shape in conventional manner and subjected, as a preform, to precision molding to obtain several lens articles. These lenses exhibited good transferring property and there was found no adhesion of the glass and evaporated matters to a mold material.

COMPARATIVE EXAMPLE

A glass of Comparative Example corresponds to that of Example 9 described in JP-A-2001-058845 (U.S. Pat. No. 6,333,282 B1). This Comparative Example gives a glass having the highest refractive index (nd) of those described in JP-A-2001-058845, which, however, does not reach the aimed refractive index (nd) of at least 1.89 according to the present invention.

TABLE 1

| | | Example 1 | Example 2 | Example 3 | Example 4 | Example 5 | Example 6 | Example 7 | Example 8 | Example 9 | Comparative Example |
|---|---|---|---|---|---|---|---|---|---|---|---|
| Composition | $P_2O_5$ | 18.18 | 5.0 | 15.36 | 12.45 | 14.19 | 8.82 | 6.51 | 11.62 | 7.0 | 17.0 |
| | $B_2O_3$ | | 2.0 | | | | | | | | 4.0 |
| | $GeO_2$ | 14.29 | 25.0 | 14.15 | 16.31 | 14.01 | 21.44 | 35.25 | 14.01 | 22.0 | 7.0 |
| | $Li_2O$ | 3.24 | 1.50 | | | | | | 1.59 | 1.50 | 3.0 |
| | $Na_2O$ | 1.02 | | 6.26 | | 4.41 | 2.88 | 1.68 | 2.66 | | 7.0 |
| | $K_2O$ | 2.03 | | | 8.27 | 1.58 | 0.88 | 1.05 | 1.62 | 1.0 | |
| | BaO | | 1.50 | 1.12 | | 2.60 | 0.98 | 1.17 | | 1.0 | 2.0 |
| | $Nb_2O_5$ | 48.01 | 20.0 | 20.79 | 23.42 | 22.91 | | 20.90 | 20.69 | 20.0 | 43.0 |
| | $Bi_2O_3$ | 13.23 | 45.0 | 42.32 | 39.55 | 40.30 | 65.0 | 33.44 | 36.83 | 47.5 | 17.0 |
| | $WO_3$ | | | | | | | | 10.98 | | |
| Characteristic Values | nd | 1.92226 | 2.01823 | 1.90701 | 1.90167 | 1.92132 | 1.96379 | 1.95006 | 1.95359 | 2.02288 | 1.88046 |
| | νd | 21.26 | 20.44 | 22.41 | 21.75 | 21.94 | 20.98 | 21.05 | 20.88 | 19.83 | 22.7 |
| | At/° C. | 577 | 514 | 526 | 576 | 543 | 451 | 559 | 496 | 511 | 520 |

ADVANTAGES OF INVENTION

According to the present invention, there can be provided an optical glass for precision molding, capable of carrying out a precision molding at a low temperature, without needing polishing and grinding after the precision molding, having a refractive index (nd) of at least 1.89 and an Abbe number (ν d) of at most 23.0, by incorporating $GeO_2$ as a very effective component for raising the refractive index of the glass in a proportion of exceeding 14%.

What is claimed is:

1. A high refractive index, high dispersion optical glass for precision molding, having a yield temperature (At) of at most 580° C., refractive index (nd) of at least 1.89 and Abbe number (vd) of at most 23.0, which is represented, in term of atoms for making up the glass, by the following chemical composition (wt %):

| | |
|---|---|
| $P_2O_5$ | 3 to 20% |
| $B_2O_3$ | 0 to 5% |
| $GeO_2$ | more than 14 to 37% |
| Sum of $P_2O_5$ + $B_2O_3$ + $GeO_2$ | 24 to 43% |
| $Li_2O$ | 0 to 5% |
| $Na_2O$ | 0 to 8% |
| $K_2O$ | 0 to 10% |
| Sum of $Li_2O$ + $Na_2O$ + $K_2O$ | 1 to 10% |
| $Nb_2O_5$ | 0 to 50% |
| $Bi_2O_3$ | 12 to 67% |
| BaO | 0 to 5% |
| $WO_3$ | 0 to 12%. |

2. A high refractive index, high dispersion optical glass for precision molding, having a yield temperature (At) of at most 580° C., refractive index (nd) of at least 1.89 and Abbe number (vd) of at most 23.0, which is represented, in term of atoms for making up the glass, by the following chemical composition (wt %):

| | |
|---|---|
| $P_2O_5$ | 4 to 19% |
| $B_2O_3$ | 0 to 3% |
| $GeO_2$ | more than 14 to 36% |
| Sum of $P_2O_5$ + $B_2O_3$ + $GeO_2$ | 25 to 42% |
| $Li_2O$ | 0 to 4% |
| $Na_2O$ | 0 to 7% |
| $K_2O$ | 0 to 9% |
| Sum of $Li_2O$ + $Na_2O$ + $K_2O$ | 1.5 to 9% |
| $Nb_2O_5$ | 0 to 49% |
| $Bi_2O_3$ | 13 to 66% |
| BaO | 0 to 3% |
| $WO_3$ | 0 to 11%. |

* * * * *